United States Patent Office 2,788,245
Patented Apr. 9, 1957

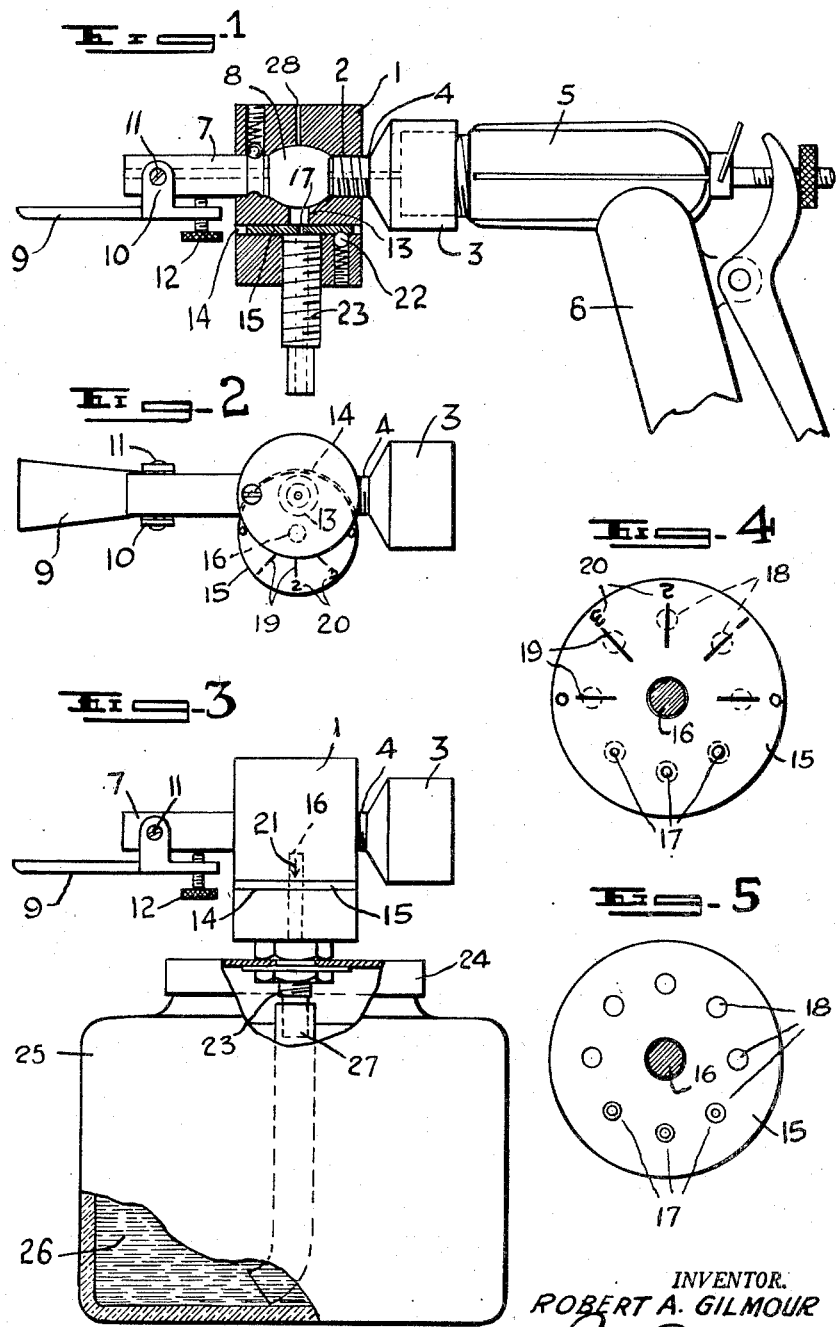

2,788,245
DISK CONTROL VALVES FOR SPRAYERS
Robert A. Gilmour, Somerset, Pa.
Application May 15, 1953, Serial No. 355,224
1 Claim. (Cl. 299—84)

This invention relates to a disk control valve for sprayer of the type designed and intended for spraying flowers, trees, shrubbery, or like plants or vegetation with an insecticide or analogous solutions.

Important objects and advantages of the invention are to provide a control valve of the character described, which embodies a disk valve member that is conveniently adjustable to accurately vary and control the quantity of the treated solution that is being added to the spraying mixture during the spraying operation, and which includes visible means for apprising the operator as to the extent of the valve adjustment providing the proper spraying mixture and thereby facilitate and expedite spraying operations.

Further objects of the invention are to provide a device of the class stated, which may be readily used by any one of ordinary skill, which is simple in its construction and arrangement, durable and efficient in its use, compact, and comparatively economical in its manufacture and use.

With the foregoing and other objects in view which will appear as the description proceeds, the invention resides in the novel construction, combination and arrangement of parts herein specifically described and illustrated in the accompanying drawing, but it is to be understood that changes in the form, proportions and details of construction may be resorted to that come within the scope of the claim hereonto appended.

In the drawing wherein like numerals of reference designate corresponding parts throughout the several views:

Figure 1 is a side elevational view, partly in cross section, of a sprayer embodying a control valve constructed in accordance with the invention.

Figure 2 is a top plan view thereof.

Figure 3 is a side elevational view of the spray control valve and illustrating the attachment of the latter with the receptacle containing the spraying treated solution.

Figure 4 is a greatly enlarged top plan view of the disk valve member.

Figure 5 is a similar bottom plan view of the disk valve member.

Referring in detail to the drawing, the improved control valve comprises a cylindrical, vertically extending body 1. The body is provided with centrally disposed, transversely extending passage 2, which is positioned adjacent to but spaced from the top of the body.

A nozzle cap 3, including a reduced apertured plug 4 having screw thread connection in the inner end of the passage 2, is carried by the body 1 and is adapted for screw thread attachment with the discharge end of the barrel 5, of a water gun 6. The water gun is of the conventional hand-controlled type of construction and is adapted for connection with a water supply hose.

A horizontally extending discharge tube 7 is revolubly supported, in any suitable manner, in the outer end of the transversely extending passage 2 and is aligned with but spaced from the cap plug 4 which is engaged in the other end of the said passage 2. The space between the adjacent ends of the discharge tube and cap plug is enlarged and forms the fluid mixing chamber 8, for the spraying mixture.

A fluid spreader 9 is shiftably supported by the discharge tube 7 adjacent to the outer free end of the latter. The fluid spreader is provided with a pair of spaced attaching lugs 10, which engage respective sides of the discharge tube and which are pivotally connected to the latter by respective pivoting screws 11.

The spreader 9 projects a considerable distance beyond the outer free end of the discharge tube 7, and the surface thereof disposed toward the discharge tube, is flat and of considerable width. The rearwardly projecting part of the spreader is provided with an adjusting screw 12, which may be adjusted to engage the discharge tube to shift the spreader to various angles from the horizontal to positions to best meet conditions found in practice. The spraying solution discharging from the discharge tube will forcibly strike against the flat surface of the spreader and thereby cause a fanlike dispersion of the spraying solution.

The valve body 1 is provided with a vertically extending, diametrically disposed valve passage 13, which extends from the mixing chamber 8 to the lower end of the valve body. The valve body is further provided with a horizontally disposed kerf 14, which is positioned below and in spaced relation to the transverse passage 2 in the valve body. The kerf is of considerable depth and extends through and beyond the wall of the vertical valve passage 13, as illustrated in Figure 2.

A flat, circular valve disk 15 is mounted for frictional revoluble adjustment in the kerf 14 by means of a vertically disposed pin 16, which extends through the diametric center of the valve disk and allows the rotation of the latter on said pin 16. The pin 16 is fixed in the valve body 1 and is eccentrically offset with respect to the axis of the valve body, whereby a considerable portion of the valve disk will always project beyond the side surface of the valve body, as clearly shown in Figure 2, while the inserted portion of the valve disk extends through and beyond the wall of the vertical valve passage 13. The diameter of the valve disk is substantially the same as the diameter of the valve body 1, and the projecting exposed portion of the valve disk is used when effecting the adjustment of the valve disk in the kerf for the purposes to be described.

The valve disk 15 is provided with three vertically disposed inlet ports 17, which vary in diameter and consequent capacity. The inlet ports are aligned concentrically with respect to the axis of the valve disk, and, for the purpose of disclosure, are spaced apart a distance of forty-five degrees. It is, of course, obvious that the number and spacing of the inlet ports may be varied to best meet conditions found in practice without departing from the principle of the invention.

The under face of the valve disk 15 is provided with a plurality of pockets 18, which are also disposed concentrically with respect to the axis of the valve disk and are in curvilinear alignment with the inlet ports 17. Each of the pockets 18 is spaced a distance of forty-five degrees from the adjacent pockets in locations whereby three of the pockets are diametrically opposed to respective inlet ports 17.

A radially extending line mark 19 and a different designating numeral 20 are displayed on the top face of the valve disk 15 at locations directly over the pockets which are diametrically opposed to respective inlet ports 17. Similar line marks and numerical designations are displayed on the top face of the valve disk at positions directly over the diametrically opposed pockets which are adjacent to the pockets diametrically opposed to the inlet ports 17.

Normally that portion of the valve disk 15, bearing the line marks 19 and numerical designations 20, will be projecting from the kerf 14 in the valve body 1, and in consequence such displayed indicia will be exposed and visible to the operator. In adjusting the valve disk by partial rotation, the path of travel of the inlet ports is such that the latter will pass singly through the center of the reduced upper portion of the valve passage 13, as clearly illustrated in Figure 2.

The adjustment of the valve disk 15 will allow the selective positioning of any one of inlet ports 14 in the vertical valve passage 13 to provide the predetermined capacity through the latter, or will allow the entire closing of the valve passage 13 by the valve disk.

To facilitate the adjustment of the valve disk 15 in the valve body 1, a vertically extending arrow mark 21 is displayed on the side of the valve body at a position directly above the center of the kerf 14. By adjusting the valve disk to position a selected line mark 19 into registration with the arrow mark 21, the operator will know at a glance by the associated numerical designation 20, which one of the inlet ports is then in the operative position in the valve passage 13. The valve disk is arrested in the adjusted position by means of a spring actuated ball 22, which is mounted and suitably located in the valve body and operable for automatic clicking and engaging action in the pocket 18 then registering with the ball.

A connecting sleeve 23 is threadedly engaged in the lower end of the valve passage 13 and projects a considerable distance beyond the lower end of the valve body 1. The projecting end of the connecting sleeve extends through the lid 24 of the receptacle 25 which contains the treated fluid 26, and is secured to said lid in any suitable manner. A hose 27 is attached to the projecting lower end of the connecting sleeve and depends into the receptacle to the bottom of the latter, as shown in Figure 3.

In the operation of the sprayer embodying the improved control valve, the forced flow of water through the nozzle cap 3, and through the transverse passage 2 and discharge tube 7, will create a vacuum drawing a predetermined quantity of the treated fluid 26 from the receptacle 25, through the hose 26 and through connecting sleeve 23 and inlet port 17, to mix with and impregnate the water flowing through the mixing chamber 8, and thereby produce the desired spraying solution. An air vent 28 in the top of the valve body will aid in vaporizing the spraying solution.

It will be noted that the device may be employed for spraying purposes by using air instead of water to create the vacuum necessary to provide the drawing action required. When so using air, the hose 27 would be extended into a quantity of premixed solution containing all of the necessary ingredients for the purpose intended. Such premixed solution may be paint, a detergent, or any other chemical composition in fluid form.

The present invention provides a most efficient device of its kind, which may be economically constructed and successfully employed for the purposes and in the manner herein set forth.

What I claim is:

A sprayer control valve of the class described comprising, in combination, a cylindrical valve body formed with a vented mixing chamber, a horizontally disposed nozzle cap connected with said body and having the inner end thereof opening into said chamber, a discharge tube disposed in alignment with said cap, the inner end of said tube opening into said chamber and being provided with an annular groove, spring actuated means mounted in said body and engaging in said groove for revolubly connecting said tube to said body, a fluid spreader adjustably connected with the outer end of said tube, said body provided with a vertically extending passage having the upper end thereof opening into said chamber, said body provided with a horizontally disposed kerf extending through said passage, a circular valve disk revolubly connected in said kerf and projecting beyond the peripheral surface of said body and extending through said passage, said disk provided with a plurality of inlet ports of varying diameters and being adjustable in said kerf to selectively position respective ports in registration with said passage, spring actuated means for holding said disk in the adjusted position, the top surface of said disk bearing indicia designating the position of said ports with respect to said passage, and a connecting sleeve engaged in the lower end of said passage.

References Cited in the file of this patent
UNITED STATES PATENTS

| | | |
|---|---|---|
| 642,120 | Hiett | Jan. 30, 1900 |
| 675,840 | Phillips | June 4, 1901 |
| 730,723 | Verschuren | June 9, 1903 |
| 1,014,070 | Laxton | Jan. 9, 1912 |
| 1,036,871 | Matheson | Aug. 27, 1912 |
| 2,138,530 | Wagner | Nov. 29, 1938 |
| 2,219,504 | Willis | Oct. 29, 1940 |
| 2,571,768 | Schlonau | Oct. 16, 1951 |